United States Patent [19]

Santilli et al.

[11] 4,419,273

[45] Dec. 6, 1983

[54] CLAY-BASED SULFUR SORBENT

[75] Inventors: Donald S. Santilli, Pinole, Calif.;
Donald W. Blakely, deceased, late of Oakland, Calif., by Robert L. Jacobson, administrator

[73] Assignee: Chevron Research Company, San Francisco, Calif.

[21] Appl. No.: 318,228

[22] Filed: Nov. 4, 1981

[51] Int. Cl.$^3$ .......................... B01J 21/16; B01J 23/72
[52] U.S. Cl. ........................................ 502/80; 502/84
[58] Field of Search ...................... 252/455 R, 457; 423/244 R

[56] References Cited

U.S. PATENT DOCUMENTS 4,224,191  9/1980  Bishop ................................. 252/463
4,258,020  3/1981  Ginger ........................... 423/244 R Primary Examiner—Carl F. Dees
Attorney, Agent, or Firm—D. A. Newell; S. R. LaPaglia

[57] ABSTRACT

A composition of matter suitable for use as a sulfur sorbent. A fibrous silicate clay with randomly dispersed fibers is mixed with alumina and a copper-containing compound so that at least 20 weight percent of the finished sorbent is copper.

8 Claims, No Drawings

CLAY-BASED SULFUR SORBENT

BACKGROUND OF THE INVENTION

This invention relates to processes to remove sulfur from petroleum feedstocks by utilizing solid sulfur sorbent of specified compositions.

Catalytic reforming processes play an integral role in upgrading straight-run or cracked naphtha feedstocks. These processes have become particularly important in recent years due to increased demand for low-lead and unleaded gasolines.

In a typical modern reforming process, a straight-run or cracked naphtha feed, having a boiling range from about 65°–230° C., or preferably 80°–200° C., is passed over a promoted noble metal catalyst on alumina at a temperature in the range of 400°–550° C., preferably 450°–530° C., a pressure in the range from atmospheric to 30 atmospheres, at a liquid hourly space velocity in the range 0.5–5, preferably 1–3, and a hydrogen to hydrocarbon mol ratio in the range 1–10. Variations in the conditions will depend in large measure upon the type of feed processed, such as whether the feed is aromatic, paraffinic or napthenic, and the desired increase in octane levels (see U.S. Pat. No. 4,082,697).

To achieve maximum run lengths and increased process efficiency, it is generally recognized that the sulfur content of the feedstock must be minimized to prevent poisoning of the catalyst. Preferably the feed will contain less than 2–10 parts per million by weight sulfur since the presence of much more sulfur in the feed decreases the activity, the stability and yield selectivity of the catalyst (see U.S. Pat. No. 3,415,737).

A common method of treating reformer feeds to reduce sulfur content is the hydrodesulfurization process wherein the naphtha is contacted with a sulfur-resistant hydrogenation catalyst in the presence of hydrogen. Catalysts for this service normally comprise Group VIB and/or Group VIII metals on refractory supports, such as molybdenum and cobalt metals, their oxides or sulfides, on alumina. The sulfur in the feed stream is converted to hydrogen sulfide, which may be separated from the naphtha by distillation, stripping and other conventional means, prior to reforming. Although good sulfur removal may be achieved by hydrodesulfurization units operating under severe conditions, the process is ultimately limited by the physical and chemical equilibrium concentration of hydrogen sulfide and mercaptans in the treated liquid feed.

If as little as 1.0 part per million by weight of $H_2S$ remains in the naphtha feedstock to the reformer, it can build up to 2–3 ppm of $H_2S$ in the reformer recycle hydrogen stream. Then the run length will be decreased by as much as 50%, $C_5+$ yields will be decreased by 1.5–2.5 liquid volume percent, and hydrogen yields decreased 100–200 SCF/B. Thus, there exists a very strong economic incentive to remove substantially all sulfur from the reformer feed stream. The sulfur sorber unit containing sulfur sorbent provides the means for removing these trace amounts of $H_2S$ and mercaptans and maintaining maximum performance of the catalytic reformer.

Sulfur sorbents can be prepared by mulling peptized alumina with a copper compound and forming particles of this mixture (see U.S. Pat. No. 4,224,191).

In general, sulfur sorbents must have high surface area and contain as much copper as possible. Carbon also has been used as a support (see U.S. Pat. No. 4,008,174).

It is known that certain clays are composed of fibrous crystalline structures rather than platy structures. Examples are attapulgite, sepiolite, halloysite and crysotile.

Sepiolite and attapulgite have been used as supports for catalytic metals for demetalation catalysts. U.S. Pat. No. 4,196,102 discloses such a catalyst and U.S. Pat. No. 4,166,026 discloses a process using such a catalyst.

Attapulgite has been used to make catalytic sweetening catalysts for hydrocarbon oils. U.S. Pat. No. 2,361,651 discloses a catalyst with less than 5 weight percent copper, when copper is measured as the reduced metal, supported on attapulgite. U.S. Pat. No. 2,593,464 discloses a catalyst, to be used in the presence of oxygen, containing less than about 20 weight percent copper, measured as copper metal, and at least 8 percent water, supported on attapulgite clay. It has been discovered that copper can be comulled into fiberous clay supports to produce sulfur sorbers that have higher loadings of copper, good pore size, and can be made either with or without alumina added for structural strength.

SUMMARY OF THE INVENTION

This invention provides a sulfur sorbent comprising a support made from a fibrous silicate clay with randomly dispersed fibers and at least enough copper-containing compound to provide a sorbent of at least 25 weight percent copper when measured as the reduced metal. The fibrous clay can be selected from the group comprising aluminum silicates, in particular, halloysite; and magnesium silicate, in particular, attapulgite, palygorskite, sepiolite, and crysotile. It is preferred that 1 to 50, more preferably 5 to 30 weight percent alumina be added to the composition. It is preferred that the support have at least 90% of its pore volume provided by pores with a diameter equal to or greater than 100 Angstroms.

DETAILED DESCRIPTION

Sulfur sorbents have heretofore been made from a variety of compositions particularly inorganic oxides, such as alumina and silica, and carbon with a variety of metals impregnated on the support to absorb sulfur compounds. It has been found that sulfur sorbents made from fibrous clays and copper works as well as sulfur sorbers made from alumina, and have the advantage of higher copper loadings and larger pores that allow the sulfur containing feedstock to diffuse into the interior of the sorbent particles more easily than in all-alumina particle. Fibrous clays useful in this invention include attapulgite, palygorskite, sepiolite, halloysite, immogalite and crysotile. Advantageously 1 to 50 weight percent alumina can be added to the clay.

"Sulfur sorbent", as used herein, refers to a composition of matter that reacts with sulfur in reduced form, as hydrogen sulfide or mercaptan sulfur, to form sulfided copper on the sorbent. Such compositions of matter are therefore not catalytic in nature, but contain the reactants that form the final product. By the use of such sorbents, sulfur is removed from the feedstock stream by the sorbent. By contrast, in a catalytic sweetening process the form of sulfur is changed, e.g. from mercaptan to thio-ether, and the sulfur remains in the product stream. It is therefore highly advantageous to have high loadings of the reactant metal in sulfur sorbents. In the case of the present invention the reactant metal is copper and its compounds.

In the present invention, copper metal, copper carbonate or copper oxide can be comulled with the support material, or an aqueous solution of a soluble copper salt, for example, copper chloride or copper nitrate, can be used to impregnate a preformed clay support.

The sulfur sorbents of this invention are typically made by forming an aqueous slurry of fibrous silicate clay, agitating the clay sufficiently to disperse the fibers randomly, shaping particles from the mixture, and drying and calcining the particles. The fibers in naturally occurring clay tend to be more or less aligned along particular axis. Dispersing the fibers of the clay into a more random, jack-straw-like structure provides more pore volume than the natural clay. The pore sizes tend to be larger than 100 Angstroms but less than 200 Angstroms. Dispersing these more or less parallel rods can be accomplished by any sufficiently energetic mixing technique for example mulling or blending. Preferred methods include agitating said fibrous clays in an aqueous slurry that is about 25% solid.

The copper-containing compound can be added with the clay and comulled into the finished sorbent or can be impregnated afterwards in the dried clay support composition as previously mentioned. One particular advantage of using attapulgite or other fibrous clays of the present invention, is that a high weight percent of copper can be supported by the fibrous clay matrix. Sulfur sorbents of 25 to 50 weight percent copper can be made by the technique of the present invention.

The precise conditions of operation for removing sulfur with a fibrous clay sulfur sorbent depend in part on feedstock sulfur content and the form of sulfur in the feedstock. A feedstock containing 0.1 to 10 ppm $H_2S$ can be removed under conditions of 150° to 450° F. and 5 to 20 hr$^{-1}$ space velocity to remove 70 to 95% of the sulfur present. A feedstock containing 0.1 to 10 ppm mercaptan sulfur in naphtha can be removed under conditions of 250° F. to 450° F. and 3 to 10 hr$^{-1}$ space velocity.

EXAMPLES

EXAMPLE 1

This example shows one method of making and using the sulfur sorbent of this invention.

45 gms of dry attapulgite clay from the University of Missouri Department of Geology Mineral Bank and 7 g of Catapal alumina, obtained from Conoco, were first mixed together and 70 gms copper carbonate was comulled with the base material in a Baker-Perkins muller. 200 ml of water was added and the wetted mixture is mulled for 30 minutes. Particles 1/16" in diameter are made by extruding the mixture to make pellets, drying at 250° F. and calcining the pelleted material at 950° F. A crush strength of 1.8 lb/mm, the surface area 60 m$^2$/g and particle density 1.000 g/cc was obtained in this preparation.

In a pilot plant test, the sulfur sorbent made by the procedure described above, reduced the sulfur content of a naphtha feed containing about 15 ppm $H_2S$ to about 1 to 2 ppm. The conditions of the pilot test were 15 hr$^{-1}$ space velocity, 200° F. temperature, and 200 psig pressure. This material had a life time of about 370 hours before the sulfur concentration of the product reached 5 ppm. At the end of service the particles contained an average of 13.9% sulfur. This is an unusually high sulfur capacity compared to available sorbents.

EXAMPLE 2

This example shows the use of a sulfur sorbent made by the process of Example 1.

A sulfur sorbent made by the process of Example 1 having a 40% copper loading and extruded as 1/16" diameter pellets was contacted with a naphtha feedstock containing 20 ppm sulfur as mercaptan. The conditions of the test were 7.5 hr$^{-1}$ space velocity, 350° F. and 150 psig pressure. For 600 hours the product sulfur was less than 3 ppm. For the next 300, the product sulfur was observed to increase to 3–10 ppm. The test was terminated at the end of 900 hours and the particles analyzed. The sulfur sorbent contained 9.0 weight percent sulfur and 6.2 weight percent carbon.

EXAMPLE 3

85 gms of attapulgite clay obtained from Engelhard, Inc. were mixed with 15 gms of Kaiser alumina and 60 gms of copper carbonate power. 200 ml 5 volume percent nitric acid was added and the slurry was mulled. Particles 1/16" in diameter were extruded and dried at 250° F. and claimed at 950° F.

The sulfur sorbent particles had a density of 1.20 gm/cc, a skeletal density of 5.40 gm/cc, and a calculated pore volume of 0.50 cc/gm.

EXAMPLE 4

A sulfur sorbent made by a process similar to Example 3 was contacted with a naphtha feedstock having about 20 ppm sulfur as mercaptan.

The conditions of the test was 7.5 hr$^{-1}$ space velocity, 350° F. temperature and 150 psig pressure. After 138 hours on stream the product contained less than 3 ppm sulfur.

It will be appreciated by those skilled in the art that pilot plant tests generally use a feed that contains much more sulfur than any feed typically encountered in commercial use, therefore in actual service the life of the sorbent would be longer.

We claim:

1. A sulfur sorbent comprising a support made from fibrous silicate clay with randomly dispersed fibers and at least enough copper-containing compound to provide a sorbent of at least 25 weight percent copper measured as the reduced metal.

2. The sulfur sorbent of claim 1 wherein the fibrous silicate clay is selected from the group comprising aluminum silicates and magnesium silicates.

3. The sulfur sorbent of claim 1 wherein the fibrous silicate clay is selected from the group consisting of attapulgite, palygorskite, sepiolite, halloysite, and crysotile.

4. The sulfur sorbent of claim 1 wherein said sulfur sorbent contains from 1 to 50 weight percent alumina.

5. The method of manufacture of a sulfur sorbent comprising:
   forming an aqueous slurry of fibrous silicate clay and a copper-containing compound;
   agitating the aqueous slurry sufficiently to disperse the fibers;
   shaping the dispersed fibers into particles;
   drying the shaped particle;
   and calcining the dried particle.

6. The method of claim 5 wherein a copper-containing compound selected from the group consisting of Cu, CuO, $CuCO_3$, CuS is added with the clay slurry.

7. The method of claim 5 wherein an aqueous solution of a copper compound selected from the group consisting of $CuNO_3$ and $CuCl_2$ is impregnated into the shaped particle.

8. The method of claim 5 wherein said aqueous slurry of fibrous silicate clay includes from 1 to 50 weight percent alumina based on the weight of fibrous silicate clay in said aqueous slurry.

* * * * *